United States Patent
Liu et al.

(10) Patent No.: US 9,629,107 B2
(45) Date of Patent: Apr. 18, 2017

(54) GAIN CONTROL METHOD AND DEVICE FOR TD-HSPA+TERMINAL DEVICE

(75) Inventors: Zhongwei Liu, Shenzhen (CN); Ning Qiu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 242 days.

(21) Appl. No.: 14/394,801

(22) PCT Filed: Jun. 25, 2012

(86) PCT No.: PCT/CN2012/077438
§ 371 (c)(1),
(2), (4) Date: Jan. 26, 2015

(87) PCT Pub. No.: WO2013/155786
PCT Pub. Date: Oct. 24, 2013

(65) Prior Publication Data
US 2015/0131463 A1    May 14, 2015

(30) Foreign Application Priority Data

Apr. 17, 2012 (CN) .......................... 2012 1 0112878

(51) Int. Cl.
*H04W 52/52* (2009.01)
*H04W 24/08* (2009.01)
(Continued)

(52) U.S. Cl.
CPC ........... *H04W 52/52* (2013.01); *H04W 24/08* (2013.01); *H04W 52/146* (2013.01); *H04W 52/286* (2013.01); *H04W 52/44* (2013.01)

(58) Field of Classification Search
CPC . H04W 24/08; H04W 52/146; H04W 52/286; H04W 52/44; H04W 52/52;
(Continued)

(56) References Cited

U.S. PATENT DOCUMENTS 6,324,389 B1 * 11/2001 Vaisanen ............... H03D 3/008
                                                     455/234.1
6,728,302 B1 *  4/2004 Dabak ...................... H04L 1/06
                                                     375/148
(Continued)

FOREIGN PATENT DOCUMENTS

CN          1794605 A      6/2006
CN        101651513 A      2/2010
(Continued)

OTHER PUBLICATIONS

International Search Report for corresponding application PCT/CN2012/077438 filed Jun. 25, 2012; Report Dated Jan. 24, 2013.

*Primary Examiner* — Chi H Pham
*Assistant Examiner* — Robert Lopata
(74) *Attorney, Agent, or Firm* — Cantor Colburn LLP (57) ABSTRACT

Disclosed are a signal gain control method and device for a TD-HSPA+ terminal device. The method comprises the following steps: when a terminal device is in a continuous packet transmission mode, it is determined whether the terminal device receives a signal from a high speed packet channel for the first time, and if not, it is determined whether a reception interval between two successively received signals is smaller than a preset interval; if the reception interval is not smaller than the preset interval, a gain $AGC_{PCCPCH}$ at a main frequency point of a primary common control physical channel (PCCPCH) of a cell is obtained, and the $AGC_{PCCPCH}$ is used to control a gain of a signal currently received by the terminal device.

15 Claims, 3 Drawing Sheets

(51) Int. Cl.
*H04W 52/14* (2009.01)
*H04W 52/28* (2009.01)
*H04W 52/44* (2009.01)

(58) Field of Classification Search
CPC ......... H04W 24/00; H04B 17/00; H04B 3/46; H04L 43/00; H04L 43/50
USPC ........................................................ 370/252
See application file for complete search history.

(56) References Cited

U.S. PATENT DOCUMENTS

| | | | |
|---|---|---|---|
| 8,958,758 B2* | 2/2015 | Tandai | H03G 3/3078 455/136 |
| 2002/0077141 A1* | 6/2002 | Hwang | H04W 52/143 455/522 |
| 2002/0115464 A1* | 8/2002 | Hwang | H04W 52/54 455/522 |
| 2004/0091034 A1* | 5/2004 | Shiu | H04B 1/1027 375/227 |
| 2006/0245397 A1* | 11/2006 | Zhang | H04W 52/08 370/335 |
| 2010/0104052 A1* | 4/2010 | Park | H04W 52/52 375/345 |

FOREIGN PATENT DOCUMENTS

| | | |
|---|---|---|
| CN | 102065528 A | 5/2011 |
| CN | 102316573 A | 1/2012 |

* cited by examiner

GAIN CONTROL METHOD AND DEVICE FOR TD-HSPA+TERMINAL DEVICE

TECHNICAL FIELD

The present invention relates to the field of wireless communications, and in particular, to a gain control method and device for a TD-HSPA+ (time division-synchronous code division multiple access-high speed packet access enhanced) terminal device.

BACKGROUND

I. A TD-HSPA+ Continuous Packet Connectivity

3GPP R8 (the 3rd generation partnership project, release 8) incorporates an HSPA+ (high speed packet access enhanced) technology into a TD-SCDMA (time division-synchronous code division multiple access) protocol. The TD-HSPA+ technology is the upgrading regarding an original HSPA technology, mainly for increasing user capacity and throughput of a system, and optimizing the support for a data service of "consistently online".

The TD-HSPA+ is a set of multiple enhanced technologies, comprising two aspects of enhancing physical layer and enhancing high layer. Technology of enhancing physical layer comprises a high order modulation, such as a 64QAM (quadrate amplitude modulation), MIMO (multiple-input multiple-out-put) and a multicarrier technology. Technology of enhancing high layer comprises enhanced CELL_FACH (cell forward access channel), enhanced layer 2 and CPC (continuous packet connectivity).

The CPC refers to "always online" of a packet user. The CPC enables, by improving the HSPA function of 3GPP R5/R6, the packet user having continuous connectivity requirements to be able to avoid bringing more expenses and time delay caused by frequent re-establishment, thus achieving the purpose of increasing the number of the packet users in the CELL-DCH (cell dedicated channel) state, increasing user capacity and system efficiency of the VoIP (voice over internet protocol).

A semi-persistent resource is incorporated into the CPC; the semi-persistent resource is valid for a long time after being configured by a NodeB; and a terminal device performs data receiving and transmitting according to an Rx mode or Tx mode configured by the NodeB. Configuration of the semi-persistent resource may be semi-static configuration and dynamic configuration. The semi-static configuration is that the terminal device is configured by an RNC (radio network controller) via an RRC (radio resource control) message in the form of a list; while the dynamic configuration is that the terminal device is configured by the NodeB via a downlink HS-SCCH (high speed shared control channel) or an uplink E-AGCH (enhanced absolute grant channel). The terminal device comprehensively obtains specific semi-persistent resource configuration of the terminal device according to dynamic properties in combination with the semi-static configuration.

For reducing power expenses of a control channel, a control channel DRX (discontinuous reception) operation is also incorporated into the CPC. The control channel DRX operation is divided into HS-SCCH DRX and E-AGCH DRX performing independently. When the system confirms that it is unnecessary for the terminal device to monitor an HS-SCCH or E-AGCH channel within a relatively long interval, the NodeB will inform the terminal device to enter a control channel DRX state by means of a timer or command, at this moment, the terminal device only needs to receive a corresponding control channel at a fixed period and time offset.

II. Automatic Gain Control

Figure 1:
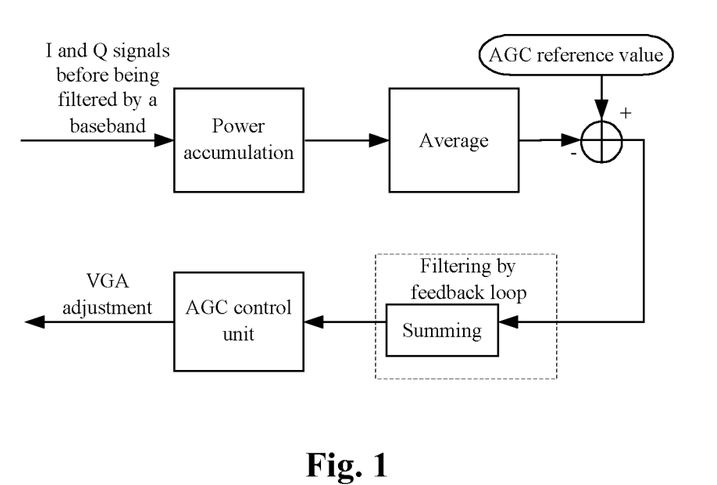
FIG. 1 is a basic schematic diagram showing controlling a gain via an AGC feedback loop in the traditional art.

In general, an input signal of a receiver has a great dynamical variation; and the purpose of AGC (automatic gain control) is to make an output signal normalized and to be kept at a relatively stable level. FIG. 1 is a basic schematic diagram showing controlling a gain via an AGC feedback loop in the traditional art. As shown in FIG. 1 an AGC control unit and a VGA (variable gain amplifier) constitute a feedback loop. I and Q signals before being filtered by a baseband are input in the feedback loop, power accumulation and average processing are performed within a period of time, then it is compared with a reference power value; an error obtained by comparing is sent to a filter of the feedback loop, and is filtered and output to the AGC control unit via the filter; and finally the AGC control unit generates gain adjustment of the VGA and LNA (low noise amplifier).

In an actual TD-SCDMA terminal receiver system, since there is a time delay in calculation processing of the AGC control unit, in general, a gain (an AGC reference value) obtained by calculation of a signal received from a certain channel last time controls a gain of a signal received from the same channel the next time. Because of fast time varying characteristics of a wireless channel, a reception interval between two signals successively received from the same channel should not be too large. In a conventional HSPA technology, in general, the interval is merely several sub-frames.

III. Problems Facing the AGC in a TD-HSPA+ CPC State

AGC control in a CPC state is different. Taking CPC transmission of HSDPA (high speed downlink packet access) as an example, a terminal device uses a set of resource patterns (containing parameters such as a repetition period and a repetition length) configured by a NodeB to receive an HS-DSCH (high-speed downlink shared channel) signal, and it is unnecessary to be scheduled by HS-SCCH signalling on a frame-by-frame basis. In a semi-persistent resource pattern specified in the protocol, the longest repetition period may reach 32 sub-frames, i.e. a reception interval between two signals successively received from a CPC HS-DSCH may reach 32 sub-frames.

Although the NodeB may amend a semi-persistent resource via HS-SCCH signalling (reconfiguring HS-SCCH), when HS-SCCH DRX is not used, sending time of reconfiguring HS-SCCH is not fixed. An interval between two times of reconfiguration of the HS-SCCH may also be very long, for example, in a typical network configuration, the interval may reach 40 sub-frames. During this time, the terminal device must continuously monitor whether there is reconfiguration HS-SCCH signalling issued on an HS-SCCH physical resource allocated thereto.

In the above-mentioned scenarios, since the interval between two signals successively received from the CPC HS-DSCH or two reconfiguring HS-SCCH signalings may be very long, a signal power may have a drastic variation during the interval. If an AGC reference value obtained by calculation of a signal received last time is directly used to control a gain of a signal received this time, the problem that the present gain can not reflect an actual signal power variation may occur, which results in that a signal converted by the terminal device is saturate or an amplitude value of the terminal device is too small, thus losing downlink data or missing critical reconfiguration scheduling information, and affecting the performance of the terminal device, such as a receiver.

SUMMARY

The present invention provides a gain control method and device for a TD-HSPA+ terminal device to at least solve the technical problem in the prior art that when it is in a TD-HSPA+ CPC state and the reception interval between two successively received signals is too long, the terminal device may not use a gain of a signal received last time to control a gain of a signal received this time.

The present invention solves the above-mentioned problem by using the following technical solutions:

A signal gain control method for a TD-HSPA+ terminal device comprises the following steps:

when the terminal device is in a continuous packet transmission mode, determining whether it is the first time that the terminal device receives a signal from a high speed packet channel:

if it is not the first time that the terminal device receives the signal from the high speed packet channel, determining whether a reception interval between two successively received signals is smaller than a preset interval; and if the reception interval is not smaller than the preset interval, obtaining a gain $AGC_{PCCPCH}$ at a main frequency point of a primary common control physical channel (PCCPCH) of a cell, and using the $AGC_{PCCPCH}$ to control a gain of a signal currently received by the terminal device.

According to a preferred embodiment, before obtaining the gain $AGC_{PCCPCH}$ of at the main frequency point of the PCCPCH, the terminal device determines whether a measured gain at the main frequency point of the PCCPCH exists, and if so, the step of obtaining the gain $AGC_{PCCPCH}$ at the main frequency point of the PCCPCH and subsequent steps thereof are performed; and otherwise:

the terminal device measures a gain $AGC_{TS0\_PCCPCH}$ at the main frequency point of the PCCPCH during a service time slot $TS_0$, then calculates a sum of the $AGC_{TS0\_PCCPCH}$ and a preset gain variate, and uses the sum of the $AGC_{TS0\_PCCPCH}$ and the preset gain variate to control the gain of the signal currently received by the terminal device.

According to a preferred embodiment, when the reception interval between two signals successively received by the terminal device is smaller than the preset interval, the terminal device determines whether a signal received by the terminal device is from an HS-DSCH or an HS-SCCH of which a channel state is DRX:

if so, the terminal device uses a gain of a signal received last time to control the gain of the currently received signal.

According to a preferred embodiment, when the reception interval between two signals successively received by the terminal device is smaller than the preset interval, the terminal device determines whether the signal received by the terminal device is from the HS-SCCH of which the channel state is non DRX, and if so:

the terminal device determines whether a signal-interference ratio of the currently received signal is greater than a preset threshold, and if so, the terminal device uses the gain of the signal received last time to control the gain of the currently received signal; and otherwise, the terminal device sets the gain of the signal received last time as a gain control reference value of a signal received the next time.

According to a preferred embodiment, if the terminal device receives the signal from the high speed packet channel for the first time, the terminal device determines whether a measured gain at the main frequency point of the PCCPCH exists:

if so, the gain $AGC_{PCCPCH}$ at the main frequency point of the PCCPCH is obtained, and the $AGC_{PCCPCH}$ is set as the gain control reference value of a signal received by the terminal device for the first time; and otherwise, the gain $AGC_{TS0\_PCCPCH}$ at the main frequency point of the PCCPCH during the service time slot $TS_0$, the sum of the $AGC_{TS0\_PCCPCH}$ and the preset gain variate is calculated, and the sum of the $AGC_{TS0\_PCCPCH}$ and the preset variate is taken as the gain control reference value of the signal received by the terminal device for the first time.

The high speed packet channel comprises the HS-DSCH and the HS-SCCH.

The value of the preset gain variate is in the range of −10 and 0 decibels.

The terminal device comprises a wireless communication receiver and a TD mobile phone.

The present invention further adopts the following technical solutions:

A signal gain control device for a TD-HSPA+ terminal device comprises: a terminal device; wherein the terminal device is configured to determine, when the terminal device is in a continuous packet transmission mode, whether the terminal device receives a signal from a high speed packet channel for the first time:

if not, the terminal device is further configured to determine whether a reception interval between two successively received signals is smaller than a preset interval; and if the reception interval is not smaller than the preset interval, to obtain a gain $AGC_{PCCPCH}$ at a main frequency point of a primary common control physical channel (PCCPCH) of a cell, and to use the $AGC_{PCCPCH}$ to control a gain of a signal currently received by the terminal device.

The terminal device comprises a first reception determination component, a reception interval determination component, a PCCPCH gain determination component, a PCCPCH gain obtaining component, a PCCPCH gain measurement component, and a gain calculation component, wherein the first reception determination component is configured to determine whether the terminal device receives the signal from the high speed packet channel for the first time;

the reception interval determination component is configured to determine whether the reception interval between two signals successively received by the terminal device is smaller than the preset interval;

the PCCPCH gain determination component is configured to determine whether a measured gain at the main frequency point of the PCCPCH of the cell exists;

the PCCPCH gain obtaining component is configured to obtain the gain $AGC_{PCCPCH}$ at the main frequency point of the PCCPCH of the cell;

the PCCPCH gain measurement component is configured to measure a gain $AGC_{TS0\_PCCPCH}$ at the main frequency point of the PCCPCH of the cell during a service time slot $TS_0$; and the gain calculation component is configured to calculate a sum of the $AGC_{TS0\_PCCPCH}$ at the main frequency point of the PCCPCH of the cell and a preset gain variate during the service time slot $TS_0$.

The terminal device further comprises an initialization gain control component, a first gain control component, and a second gain control component, wherein the initialization gain control component is configured to set, when the terminal device receives the signal from the high speed packet channel for the first time, the gain $AGC_{PCCPCH}$ obtained by the PCCPCH gain obtaining component or the gain calculated by the gain calculation component as a gain control reference value of a signal received by the terminal device for the first time;

the first gain control component is configured to, when the reception interval between two signals successively received by the above-mentioned terminal device is not smaller than the preset interval, use the gain $AGC_{PCCPCH}$ obtained by the PCCPCH gain obtaining component or the gain calculated by the gain calculation component to control the gain of the signal currently received by the terminal device; and the second gain control component is configured to use, when the reception interval between two signals successively received by the terminal device is smaller than the preset interval, the gain of the signal received by the terminal device last time to control the gain of the currently received signal, or to set the gain of the signal received by the above-mentioned terminal device last time as the gain control reference value of a signal received the next time.

The terminal device comprises a wireless communication receiver and a TD mobile phone.

Compared with the solution in the traditional art, the present invention has the following beneficial effects: the present invention performs special processing when a reception interval between two signals successively received by the terminal device which is in a CPC mode is too great; by using the gain at the main frequency point of the PCCPCH of the cell, the terminal device can accurately adjust the gain of the currently received signal; therefore, even in a CPC mode, the terminal device does not lose any downlink data or important reconfiguration scheduling information.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

For making the technical problems, the technical solutions and the beneficial effects of the present invention more clear, the present invention is described below with reference to the drawings and embodiments in detail. It should be understood that specific embodiments described here are only used for illustrating the present invention and not intended to limit the present invention.

Figure 2:
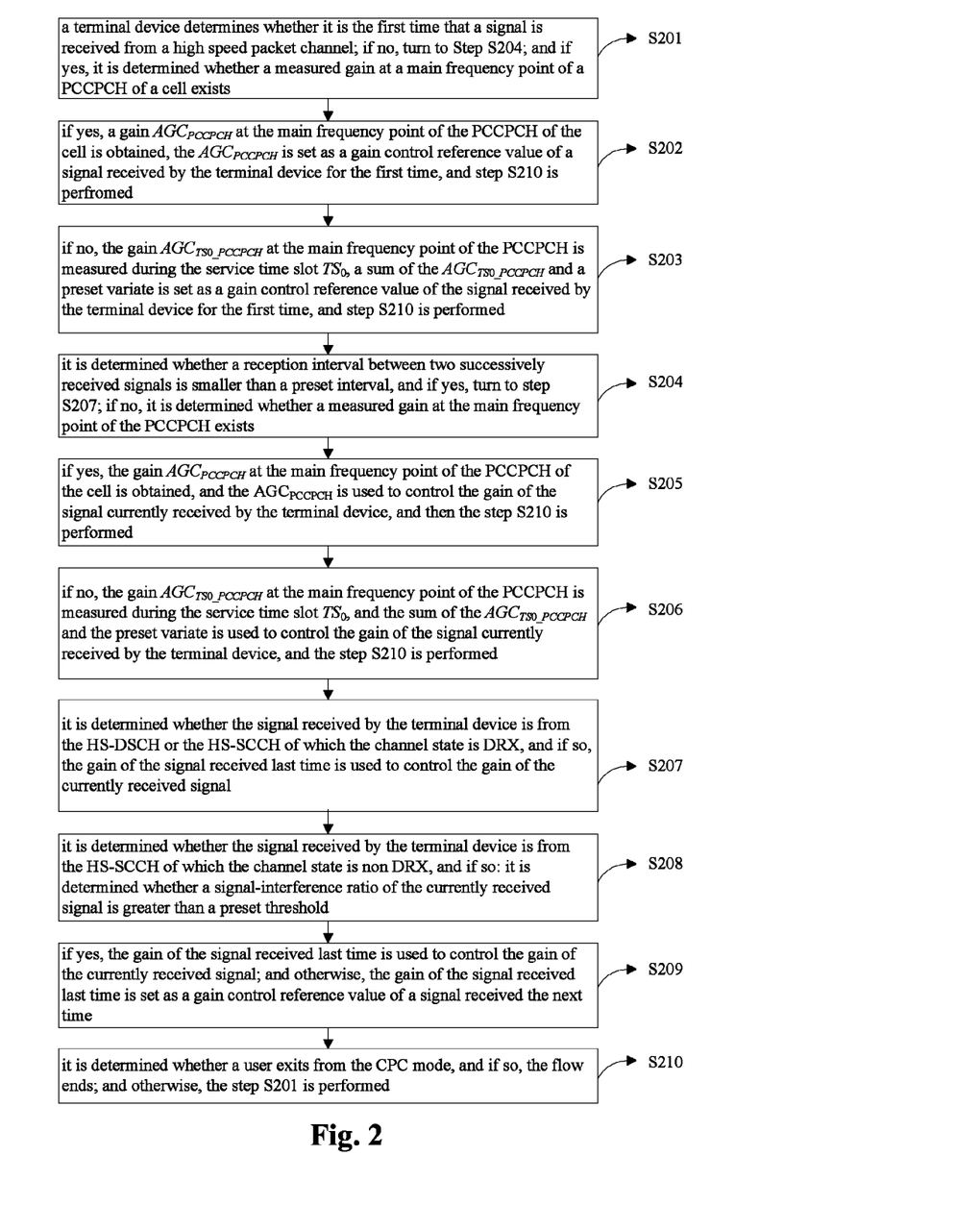
FIG. 2 shows a flowchart of a gain control method for a TD-HSPA+ terminal device in a preferred embodiment of the present invention.

FIG. 2 shows a flowchart of a gain control method for a TD-HSPA+ terminal device in a preferred embodiment of the present invention. As shown in FIG. 2, the method in the preferred embodiment of the present invention comprises the following steps:

Step S201: a terminal device determines whether it is the first time that a signal is received from a high speed packet channel; if no, turn to Step S204; and if yes, it is determined whether a measured gain at a main frequency point of a PCCPCH of a cell exists.

The high speed packet channel in the present embodiment comprises an HS-DSCH and an HS-SCCH. It should be understood that the present invention is also applicable to other downlink code channels, such as an E-AGCH and an E-HICH (enhanced HARQ indicator channel). The above-mentioned terminal device comprises a wireless communication receiver and a TD mobile phone.

Step S202: if the measured gain at the main frequency point of the PCCPCH of the cell exists, a gain $AGC_{PCCPCH}$ at the main frequency point of the PCCPCH of the cell is obtained, the $AGC_{PCCPCH}$ is set as a gain control reference value of a signal received by the terminal device for the first time, and step S210 is performed.

The gain control reference value is used for controlling a gain of a signal received by the terminal device for the first time. The gain $AGC_{PCCPCH}$ at the main frequency point of the PCCPCH of the cell is mainly obtained by measurement via a NodeB on two code channels of the PCCPCH of the cell, and the terminal device may additionally obtain the gain $AGC_{PCCPCH}$ at the main frequency point via a normal measurement task of the PCCPCH.

Step S203: if the measured gain at the main frequency point of the PCCPCH of the cell does not exist, the gain $AGC_{TS0\_PCCPCH}$ at the main frequency point of the PCCPCH is measured during the service time slot $TS_0$, a sum of the $AGC_{TS0\_PCCPCH}$ and a preset variate is set as a gain control reference value of the signal received by the terminal device for the first time, and step S210 is performed.

When there is not the gain $AGC_{PCCPCH}$ at the main frequency point of the PCCPCH of the cell, the terminal device may spontaneously measure the gain $AGC_{TS0\_PCCPCH}$ at the main frequency point of the PCCPCH during the service time slot $TS_0$; and since all the code channels of the PCCPCH of the cell are measured in the spontaneous measurement, the difference between the $AGC_{PCCPCH}$ and $AGC_{TS0\_PCCPCH}$ may be balanced via a preset variate.

The value of the preset variate may be in the range of −10 to 0 decibels; and as a preferred embodiment, here −10 is taken.

Step S204: it is determined whether a reception interval between two successively received signals is smaller than a preset interval, and if yes, turn to step S207; if no, it is determined whether a measured gain at the main frequency point of the PCCPCH exists.

The preset interval may be freely configured, not more than eight sub-frames in general; and in the present embodiment, the preset interval is eight sub-frames. When the reception interval between two signals successively received by the terminal device is not smaller than the preset interval, a gain of a signal received by the terminal device last time may not be directly used to control a gain of a currently received signal, and it is required to be processed via steps S205 and 206.

Step S205: if the measured gain at the main frequency point of the PCCPCH exists, the gain $AGC_{PCCPCH}$ at the main frequency point of the PCCPCH of the cell is obtained, and the $AGC_{PCCPCH}$ is used to control the gain of the signal currently received by the terminal device, and then the step S210 is performed.

Step S206: if the measured gain at the main frequency point of the PCCPCH does not exist, the gain $AGC_{TS0\_PCCPCH}$ at the main frequency point of the PCCPCH is measured during the service time slot $TS_0$, and the sum of the $AGC_{TS0\_PCCPCH}$ and the preset variate is used to control the gain of the signal currently received by the terminal device, and the step S210 is performed.

When the reception interval between two signals successively received by the terminal device is smaller than the preset interval, the gain of the currently received signal may be controlled by a policy of "inherited transmission" of the present invention in general. When the terminal device is in a CPC mode, there are two reception conditions; one condition is that the terminal device may know the exact time of downlink reception, such as a periodically received downlink data channel HS-DSCH or a downlink control channel HS-SCCH which is in a DRX period; and in this case, the terminal device may use the gain of the signal received last time to control the gain of the currently received signal (inherited transmission). The other condition is that the terminal device may not determine the exact time of downlink reception, for example, the terminal device must continuously monitor the downlink control channel which is in a non DRX state; in this case, the terminal device must determine whether a real and effective downlink signal exists, and if it does exist, the terminal device may use the gain of the signal received last time to control the gain of the currently received signal; and otherwise, the terminal device should keep and transmit to the next the gain received from valid reception last time.

With regard to the above-mentioned two conditions when the reception interval between two signals successively received by the terminal device is smaller than the preset interval, the corresponding processing is performed respectively in the steps S207-209, thus enabling the terminal device to be able to control the gain of the received signal.

Step S207: it is determined whether the signal received by the terminal device is from the HS-DSCH or the HS-SCCH of which the channel state is DRX, and if so, the gain of the signal received last time is used to control the gain of the currently received signal;

step S208: it is determined whether the signal received by the terminal device is from the HS-SCCH of which the channel state is non DRX, and if so: it is determined whether a signal-interference ratio of the currently received signal is greater than a preset threshold; and step S209: if the signal-interference ratio of the currently received signal is greater than the preset threshold, the gain of the signal received last time is used to control the gain of the currently received signal; and otherwise, the gain of the signal received last time is set as a gain control reference value of a signal received the next time.

When the control channel is in a non DRX state, the terminal device needs to continuously monitor the HS-SCCH channel, because the terminal device may not determine in advance whether a NodeB issues HS-SCCH information on a current sub-frame, wherein the HSD-SCCH information is used for semi-persistent resource reconfiguration. Thus, the terminal device needs to detect whether a signalling is issued on the current sub-frame by the signal-interference ratio of a receive channel, and then decides whether to employ the policy of "inherited transmission".

Step S210: it is determined whether a user exits from the CPC mode, and if so, the flow ends; and otherwise, the step S201 is performed.

The above-mentioned steps describe the technical solutions of the preferred embodiments of the present invention in detail. In the preferred embodiment of the present invention, the special process is performed when a reception interval between two signals successively received by the terminal device which is in a CPC mode is too great; by using the gain at the main frequency point of the PCCPCH, the terminal device may accurately adjust the gain of the currently received signal, wherein the transmitting power at the main frequency point is stable, and the relationship between the transmitting power at the main frequency point and the downlink transmitting power of the NodeB is constant; therefore, even in a CPC mode, the terminal device does not lose any downlink data or important reconfiguration scheduling information.

Figure 3:
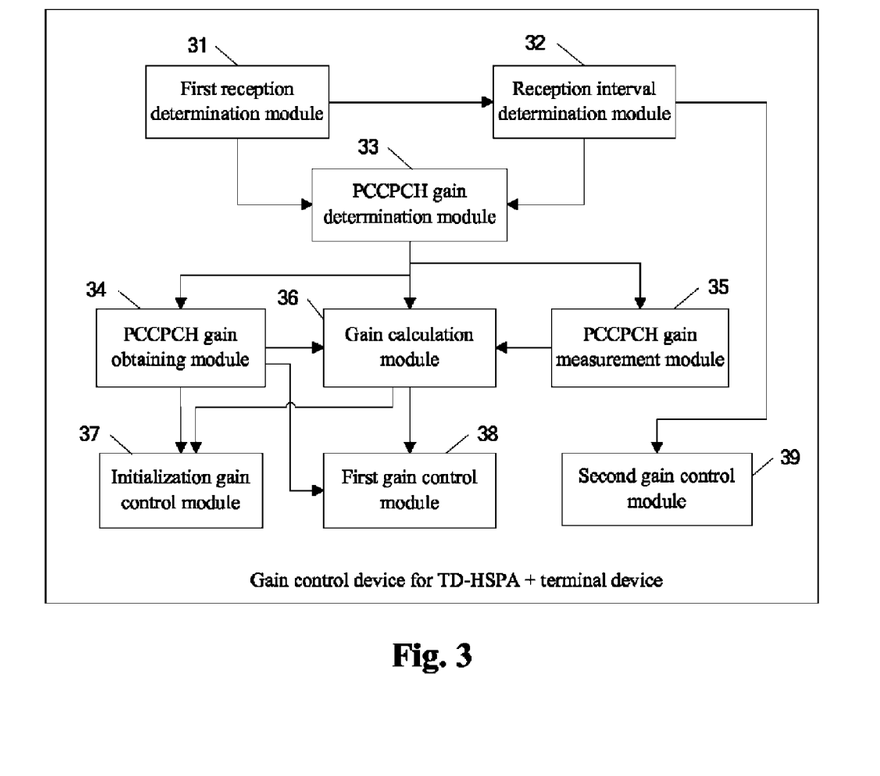
FIG. 3 shows a block diagram of a gain control device for a TD-HSPA+ terminal device in a preferred embodiment of the present invention.

FIG. 3 shows a block diagram of a gain control device for a TD-HSPA+ terminal device in a preferred embodiment of the present invention. As shown in FIG. 3, the device in the preferred embodiment of the present invention comprises a terminal device.

The device is configured to determine, when the terminal device is a continuous packet transmission mode, whether it is the first time that the terminal device receives a signal from a high speed packet channel.

If it is not the first time that the terminal device receives the signal from the high speed packet channel, it is determined whether a reception interval between two successively received signals is smaller than a preset interval; and if the reception interval is not smaller than the preset interval, a gain $AGC_{PCCPCH}$ at a main frequency point of a primary common control physical channel (PCCPCH) of a cell is obtained, and the $AGC_{PCCPCH}$ is used to control a gain of a signal currently received by the terminal device.

The terminal device comprises a first reception determination component 31, a reception interval determination component 32, a PCCPCH gain determination component 33, a PCCPCH gain obtaining component 34, a PCCPCH gain measurement component 35, and a gain calculation component 36.

The first reception determination component 31 is configured to determine whether it is the first time that the terminal device receives the signal from the high speed packet channel.

The reception interval determination component 32 is configured to determine whether the reception interval between two signals successively received by the terminal device is smaller than the preset interval.

The PCCPCH gain determination component 33 is configured to determine whether a measured gain at the main frequency point of the PCCPCH of the cell exists.

The PCCPCH gain obtaining component 34 is configured to obtain the gain $AGC_{PCCPCH}$ at the main frequency point of the PCCPCH of the cell;

The PCCPCH gain measurement component 35 is configured to measure a gain $AGC_{TS0\_PCCPCH}$ at the main frequency point of the PCCPCH of the cell during a service time slot $TS_0$.

The gain calculation component 36 is configured to calculate a sum of the AGCTS0_PCCPCH at the main frequency point of the PCCPCH of the cell and a preset gain variate during the service time slot $TS_0$.

The terminal device further comprises an initialization gain control component 37, a first gain control component 38, and a second gain control component 39.

The initialization gain control component 37 is configured to set, when the terminal device receives the signal from the high speed packet channel for the first time, the gain $AGC_{PCCPCH}$ obtained by the PCCPCH gain obtaining component 34 or the gain obtained by calculation via the gain calculation component 36 as a gain control reference value of a signal received by the terminal device for the first time.

The first gain control component 38 is configured to set, when the reception interval between two signals successively received by the terminal device is not smaller than the preset interval, use the gain $AGC_{PCCPCH}$ obtained by the PCCPCH gain obtaining component 34 or the gain obtained by calculation via the gain calculation component 36 to control the gain of the signal currently received by the terminal device.

The second gain control component 39 is configured to use, when the reception interval between two signals successively received by the terminal device is smaller than the preset interval, the gain of the signal received by the terminal device last time to control the gain of the currently received signal, or to set the gain of the signal received by the terminal device last time as the gain control reference value of a signal received the next time.

The terminal device may be a wireless communication receiver and a TD mobile phone.

The preferred embodiments of the present invention have been shown and described in the above-mentioned description; however, as stated above, it should be understood that the present invention is not limited to the form disclosed herein, should not be regarded as excluding of other embodiments, and can be used in various other combinations, amendments and environments, which moreover, can be modified via the above-mentioned teachings or techniques and knowledge in the relevant art within the concept scope of the invention as defined herein. Modifications and changes can be made by those skilled in the art without departing from the spirit and scope of the present invention, and should be within the protection scope of the appended claims of the present invention.

What is claimed is:

1. A signal gain control method for a TD-HSPA+ terminal device, comprising:
    when the terminal device is in a continuous packet transmission mode, determining whether it is the first time that the terminal device receives a signal from a high speed packet channel; and
    if it is not the first time that the terminal device receives the signal from the high speed packet channel, determining whether a reception interval between two successively received signals is smaller than a preset interval; and if the reception interval is not smaller than the preset interval, obtaining a gain $AGC_{PCCPCH}$ at a main frequency point of a Primary Common Control Physical Channel (PCCPCH) of a cell, and using the $AGC_{PCCPCH}$ to control a gain of a signal currently received by the terminal device.

2. The method according to claim 1, wherein before obtaining the gain $AGC_{PCCPCH}$ at the main frequency point of the PCCPCH, the terminal device determines whether a measured gain at the main frequency point of the PCCPCH exists, and if the measured gain at the main frequency point of the PCCPCH exists, the step of obtaining the gain $AGC_{PCCPCH}$ at the main frequency point of the PCCPCH and subsequent steps thereof are performed; and otherwise:
    the terminal device measures a gain $AGC_{TS0\_PCCPCH}$ at the main frequency point of the PCCPCH during a service time slot $TS_0$, then calculates a sum of the $AGC_{TS0\_PCCPCH}$ and a preset gain variate, and uses the sum of the $AGC_{TS0\_PCCPCH}$ and the preset gain variate to control the gain of the signal currently received by the terminal device.

3. The method according to claim 2, wherein when the reception interval between two signals successively received by the terminal device is smaller than the preset interval, the terminal device determines whether a signal received by the terminal device is from a High Speed Downlink Shared Channel (HS-DSCH) or a High Speed Shared Control Channel (HS-SCCH) of which a channel state is discontinuous reception (DRX):

if the signal received by the terminal device is from the HS-DSCH or the HS-SCCH of which the channel state is discontinuous reception (DRX), the terminal device uses a gain of a signal received last time to control the gain of the currently received signal.

4. The method according to claim 2, wherein when the reception interval between two signals successively received by the terminal device is smaller than the preset interval, the terminal device determines whether the signal received by the terminal device is from the HS-SCCH of which the channel state is non DRX, and if so,
    the terminal device determines whether a signal-interference ratio of the currently received signal is greater than a preset threshold, and if so, the terminal device uses the gain of the signal received last time to control the gain of the currently received signal; and otherwise, the terminal device sets the gain of the signal received last time as a gain control reference value of a signal received the next time.

5. The method according to claim 3, wherein if it is the first time that the terminal device receives the signal from the high speed packet channel, the terminal device determines whether a measured gain at the main frequency point of the PCCPCH exists:
    if so, the gain $AGC_{PCCPCH}$ at the main frequency point of the PCCPCH is obtained, and the $AGC_{PCCPCH}$ is set as the gain control reference value of a signal received by the terminal device for the first time; and otherwise, the gain $AGC_{TS0\_PCCPCH}$ at the main frequency point of the PCCPCH during the service time slot $TS_0$ is measured, the sum of the $AGC_{TS0\_PCCPCH}$ and the preset gain variate is calculated, and the sum of the $AGC_{TS0\_PCCPCH}$ and the preset variate is taken as the gain control reference value of the signal received by the terminal device for the first time.

6. The method according to claim 5, wherein: the high speed packet channel comprises the HS-DSCH and the HS-SCCH.

7. The method according to claim 5, wherein the value of the preset gain variate is in the range of about −10 to 0 decibels.

8. The method according to claim 5, wherein: the terminal device comprises a wireless communication receiver and a TD mobile phone.

9. A signal gain control device for a TD-HSPA+ terminal device, comprising: a terminal device; wherein
    the terminal device determines whether it is the first time that the terminal device receives a signal from a high speed packet channel, when the terminal device is in a continuous packet transmission mode;
    determines whether a reception interval between two successively received signals is smaller than a preset interval, when it is not the first time that the terminal device receives the signal from the high speed packet channel;
    obtains a gain $AGC_{PCCPCH}$ at a main frequency point of a Primary Common Control Physical Channel (PCCPCH) of a cell, when the reception interval is not smaller than the preset interval; and
    uses the $AGC_{PCCPCH}$ to control a gain of a signal currently received by the terminal device.

10. The device according to claim 9, wherein the terminal device comprises a first reception determination component, a reception interval determination component, a PCCPCH gain determination component, a PCCPCH gain obtaining component, a PCCPCH gain measurement component, and a gain calculation component, wherein the first reception determination component is connected with the reception interval determination component, and is configured to determine whether it is the first time that the terminal device receives the signal from the high speed packet channel;

the reception interval determination component is connected with the first reception determination component, and is configured to determine whether the reception interval between two signals successively received by the terminal device is smaller than the preset interval;

the PCCPCH gain determination component is connected with the first reception determination component and the reception interval determination component, and is configured to determine whether a measured gain at the main frequency point of the PCCPCH of the cell exists;

the PCCPCH gain obtaining component is connected with the PCCPCH gain determination component, and is configured to obtain the gain $AGC_{PCCPCH}$ at the main frequency point of the PCCPCH of the cell;

the PCCPCH gain measurement component is connected with the PCCPCH gain determination component, and is configured to measure a gain $AGC_{TS0\_PCCPCH}$ at the main frequency point of the PCCPCH of the cell during a service time slot $TS_0$; and the gain calculation component is connected with the PCCPCH gain determination component, the PCCPCH gain obtaining component and the PCCPCH gain measurement component, and is configured to calculate a sum of the $AGC_{TS0\_PCCPCH}$ at the main frequency point of the PCCPCH of the cell and a preset gain variate during the service time slot $TS_0$.

11. The device according to claim 10, wherein the terminal device further comprises an initialization gain control component, a first gain control component, and a second gain control component; wherein the initialization gain control component is connected with the PCCPCH gain obtaining component and the gain calculation component, and is configured to set, when the terminal device receives the signal from the high speed packet channel for the first time, the gain $AGC_{PCCPCH}$ obtained by the PCCPCH gain obtaining component or the gain calculated by the gain calculation component as a gain control reference value of a signal received by the terminal device for the first time;

the first gain control component is connected with the PCCPCH gain obtaining component and the gain calculation component, and is configured to, when the reception interval between two signals successively received by the terminal device is not smaller than the preset interval, use the gain $AGC_{PCCPCH}$ obtained by the PCCPCH gain obtaining component or the gain calculated by the gain calculation component to control the gain of the signal currently received by the terminal device; and the second gain control component is connected with the reception interval determination component, and is configured to use, when the reception interval between two signals successively received by the terminal device is smaller than the preset interval, the gain of the signal received by the terminal device last time to control the gain of the currently received signal, or to set the gain of the signal received by the terminal device last time as the gain control reference value of a signal received the next time.

12. The Device according to claim 9, wherein the terminal device comprises a wireless communication receiver and a TD mobile phone.

13. The method according to claim 4, wherein if it is the first time that the terminal device receives the signal from the high speed packet channel for the first time, the terminal device determines whether a measured gain at the main frequency point of the PCCPCH exists:

if so, the gain $AGC_{PCCPCH}$ at the main frequency point of the PCCPCH is obtained, and the $AGC_{PCCPCH}$ is set as the gain control reference value of a signal received by the terminal device for the first time; and otherwise, the gain $AGC_{TS0\_PCCPCH}$ at the main frequency point of the PCCPCH during the service time slot $TS_0$ is measured, the sum of the $AGC_{TS0\_PCCPCH}$ and the preset gain variate is calculated, and the sum of the $AGC_{TS0\_PCCPCH}$ and the preset variate is taken as the gain control reference value of the signal received by the terminal device for the first time.

14. The Device according to claim 10, wherein the terminal device comprises a wireless communication receiver and a TD mobile phone.

15. The Device according to claim 11, wherein the terminal device comprises a wireless communication receiver and a TD mobile phone.

* * * * *